United States Patent Office 3,418,599
Patented Dec. 24, 1968

3,418,599
Q-SWITCHING DYE SOLUTION FOR LIGHT
CONTROL OF GIANT PULSE LASERS
Bernard H. Soffer, Northridge, Calif., assignor to Union
Carbide Corporation, a corporation of New York
Filed May 1, 1964, Ser. No. 364,169
2 Claims. (Cl. 331—94.5)

ABSTRACT OF THE DISCLOSURE

A Q-switching device in the form of a reversibly bleachable organic dye constituting a solution of kryptocyanine is provided in the optical cavity of a giant pulse laser system. This solution is automatically responsive to an initial stimulated emission of radiation from the laser to change from a substantially opaque condition to a substantially transparent condition to thereby release a high peak power pulse of radiation, and thereafter back to a substantially opaque condition upon cessation of such peak power pulse. Q-switching is thus accomplished automatically as opposed to the normal means as by a Kerr or Pockel cell.

---

Figure 1:
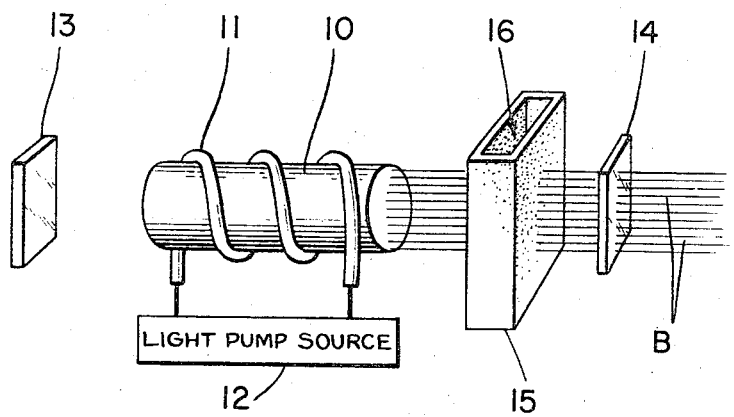

This invention relates generally to light control means and more particularly to a light control means useful in combination with a giant pulse laser device.

While the preferred embodiment of the invention is in combination with a giant pulse laser device, the light control means itself, as a subcombination, may find wide application in other optical systems.

Conventional lasers comprise a host crystal doped with a primary additive providing the laser ions. Regeneration means in the form of reflective end coatings or mirrors are positioned at the ends of the crystal to define an optical cavity. Light energy is optically pumped into the crystal resulting in an inverted population between two energy levels of the laser ions. When a given threshold or inverted state is attained, a stimulated emission of radiation of light from the crystal will occur. This stimulated emission is effectively generated by light passing back and forth through the crystal in the optical cavity. The emitted light is of a frequency corresponding to the energy difference between the two energy levels.

The stimulated emission generated when the inverted population tends to return to its original state may be coupled out of the system by making one of the end coatings or mirrors partially reflective or alternatively providing a small opening in one end mirror.

A giant pulse laser is similar to the conventional laser described above except that a light switch such as a Kerr or Pockel cell is incorporated in the optical cavity. This light control cell essentially spoils the Q of the optical cavity by blocking light to permit a much greater inverted population level to be achieved in the laser crystal before stimulated emission takes place. At a given time during the light pumping cycle, an external trigger changes the state of the cell to render it substantially transparent so that the Q of the optical cavity is restored. Since a considerably larger energy level may be built up in the laser from the light pump source before laser action can take place as a consequence of the "Q-spoiling," when this energy is finally released upon triggering of the Kerr or Pockel cell, a giant pulse of radiation results.

Light control means in the form of Kerr or Pockel cells employed heretofore in giant pulse lasers are relatively expensive, require a high voltage for operation, and thus an auxiliary power supply, and must employ a timing circuit in order that the cell may be triggered at the proper time to result in a giant pulse. In addition, a polarizer may be necessary in the optical cavity for effective operation of the Kerr or Pockel cell.

Other light control means may take the form of mechanically mounted rotating mirrors disposed in the optical cavity to deflect light from the optical cavity during the light pumping operation so that the desired giant pulse will only be released when the mirrors are properly aligned. These mirror systems must be extremely mechanically accurate and are therefore expensive. Further, timing control is difficult to achieve. Finally, the speed of rotation is such that the mirrors may mechanically disintegrate under large centrifugal forces.

To avoid some of the foregoing difficulties, it has recently been proposed to employ a dye film on a glass substrate. This film has a high absorption for light at the laser frequency. As light energy is pumped into the laser system, laser light incident on the film functions to suddenly "bleach" the dye to a transparent condition to restore the optical cavity Q and permit release of a giant laser pulse. It has been found, however, that the dye film is destroyed by the laser beam itself. Further, with such films as have been provided heretofore, the process is not reversible so that only a single giant pulse may be generated.

In all such "Q-spoiling" systems devised heretofore, there is some degradation or loss of efficiency in the laser beam as a consequence of the presence of the light control means in the optical cavity.

With all of the foregoing in mind, it is accordingly a primary object of this invention to provide a novel light control means particularly adapted for use with a giant pulse laser device which avoids the various problems set forth above.

More particularly, it is an object to provide a light control means which is responsive to the initiation of stimulated emission by the laser device itself to the end that high voltage power supplies, timing circuits, and other external controls are not necessary.

Another object is to provide a light control means in a giant pulse laser device in which no mechanical moving parts are necessary to effect a proper "Q-spoiling" of the optical cavity to the end that a considerably simpler, more reliable, and less expensive means for providing giant pulses is realized.

Another important object is to provide a light control means for use in a giant pulse laser device in which negligible degradation of the light beam in the optical cavity during stimulated emission results.

Still another important object is to provide a light control means which is reversible so that a succession of giant laser pulses may be generated.

Briefly, these and many other objects and advantages of this invention are attained by providing a light control means in the form of a chemical substance adapted to be positioned in the optical cavity of a laser system. The principal and essential characteristic of this chemical substance is that it exhibits a high absorption cross-section at the laser frequency and that when the molecules and/or atoms of the substance are excited from a first energy level to a second energy level by the incident light from the laser system, the absorption decreases so that the substance becomes substantially transparent. In this respect, the time interval or "existence time" of the excited molecules or atoms in the second energy state is preferably longer than the width of the giant pulse process in order that a transference of a majority of the molecules or atoms to the excited state can take place. In other words, the incident light must be such as to "pump up" more of the molecules or atoms to the excited state than "fall back" to the unexcited state.

By using a chemical substance having the foregoing characteristics in the optical cavity of a giant pulse laser, laser action will be inhibited because of the high absorption of the substance in the absence of a sufficient amount of incident light of later frequency thus providing a substantially opaque optical element in the optical cavity. The Q of the optical cavity is thus spoiled. As optical energy is continuously pumped into the laser crystal, however, there will be sufficient initial laser action to generate light resulting in the desired excitation of the molecules or atoms in the substance so that it sends towards transparency. The instance that the substance becomes less opaque or more transparent, the greater will be the Q of the optical cavity resulting in more incident laser light so that the process is regenerative, and in an extremely short time will result in a complete change in state of the chemical substance to a condition of transparency. At this point, a giant laser pulse will be released.

Upon cessation of the laser pulse, the chemical substance will resume its initial condition in which it is substantially opaque.

In a prefered embodiment of the light control means itself, the chemical substance constitutes a reversibly bleachable organic dye.

Figure 2:
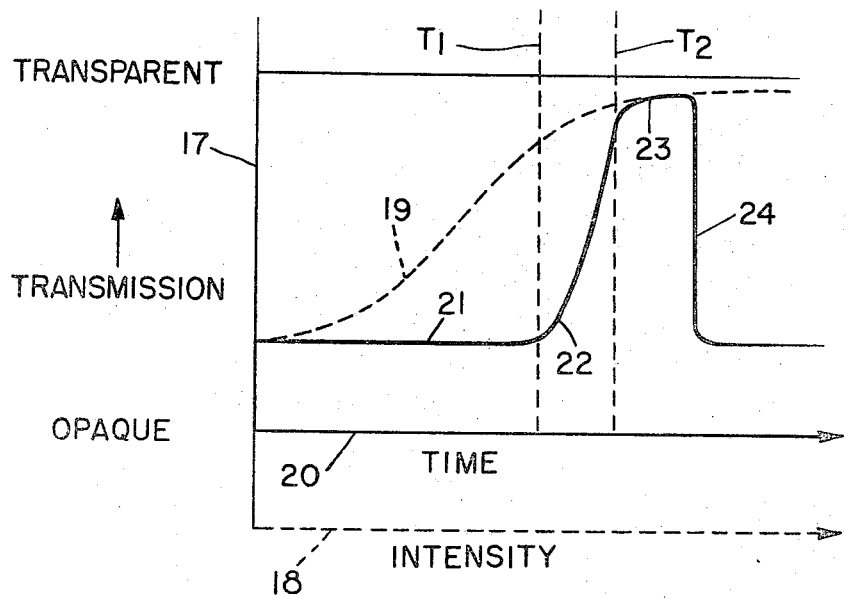

A better understanding of the invention will be had by now referring to a preferred embodiment thereof as illustrated in the accompanying drawings, in which:

FIGURE 1 is a highly schematic representation of a giant pulse laser device incorporating the light control means in accordance with the invention; and, FIGURE 2 is a qualitative plot illustrating characteristics of the light control means useful in explaining the operation of the device of FIGURE 1.

Referring first to FIGURE 1, there is shown a solid state laser crystal 10 surrounded by a spiral flash lamp 11 powered from a suitable light pump source 12. Regenerative means in the form of end mirrors 13 and 14 respectively are provided to define an optical cavity for the laser 10. In the particular example illustrated, these mirrors were 100% and 85% reflecting respectively. A light control means in accord with the present example takes the form of a quartz cell 15 incorporating a chemical substance 16. In the embodiment chosen for illustrative purposes, the chemical substance 16 constitutes a reversibly bleachable organic dye such as kryptocyanine dissolved in methyl alcohol. The concentration of the kryptocyanine may be of the order of $10^{15}$ molecules per cc. of methyl alcohol in a cell 1 cm. in length.

In the particular example illustrated, the laser 10 constitutes a ruby crystal 4 inches long and ⅜ inch in diameter with .05% by weight chromium. The wave length of stimulated emission shown at B from this particular laser is 6943 A. and at this wave length, the kryptocyanine exhibits a large absorption cross-section. The cell is thus substantially opaque and prevents any stimulated emission in the optical cavity from taking place during the initial light pumping of the laser.

In the absence of the light control cell 15, a threshold of approximately 900 joules results in ordinary laser action. With the light control cell in position in the optical cavity, an input energy of approximately 3000 joules is required to produce giant laser pulses of approximately 20 megawatts peak power.

The manner in which the light control cell 15 of FIGURE 1 inhibits laser action until an extraordinarily high amount of energy is built up in the laser and the manner in which this energy is then released will be better understood by now referring to FIGURE 2.

In FIGURE 2 there is shown a graph in which the ordinate 17 qualitatively represents the degree of transmission or transparency of the organic dye in the cell 15 of FIGURE 1, and the lower abscissa in dashed lines 18 represents the degree of light intensity from a light source which may be varied linearly in intensity as distinct from the laser of FIGURE 1. The dashed curve 19 is plotted with respect to the ordinate 17 and abscissa 18 qualitatively represents the degree of transparency of the cell 15 with respect to a uniformly varying light intensity from zero to a maximum value.

As shown, the cell will initially move towards transparency as the molecules in the solution become excited by incident light. The rate of change towards transparency is relatively slow at first and then increases to define a generally S-shaped curve which levels off towards the transparent condition.

The abscissa 20 represents time and the solid curve represents the change in transparency of the cell 15 when incorporated in the giant pulse laser system of FIGURE 1. In this case, the light intensity is not uniformly increased but rather, as the optical pumping means effects an inverted population level in the laser 10, there is essentially no light in the optical cavity. Thus the cell remans substantially opaque as indicated by the initial horizontal portion 21 of the solid line curve. There will be a slight amount of light leakage which accounts for a slight slope on the line 21 towards transparency.

At a given time T1 when a considerable amount of energy has been absorbed by the laser crystal, a slight amount of laser action will be initiated. The cell 21 is not so opaque that some regeneration cannot commence between the end mirrors 13 and 14. This initial laser action will greatly increase any small amount of light incident upon the cell 15 with a result that there will be a rapid excitation of the molecules in the cell to a second energy level. As this second energy level increases in population, the cell becomes more transparent and this increased transparency immediately permits increased laser action in the optical cavity to thereby further increase the incident light. The combination of the cell and laser thus is regenerative in nature so that an extremely rapid switching from a substantially opaque to a substantially transparent condition in the cell results, as indicated at 22 and 23 and between the times T1 and T2.

When the molecules in the cell are "bleached" or substantially all in the excited energy level, the stimulated emission of radiation effected in the optical cavity can take place the same as though the cell 15 were not present resulting in the release of a giant pulse.

Upon cessation of the optical pumping pulse of light into the laser and cessation therefore of the giant pulse a short time later, the cell will return to its normal opaque condition as indicated by the line 24.

If the pumping light pulse is of a longer duration, the laser may again build up an inverted population level and effect another, and perhaps several, giant pulses during a single pumping pulse, the cell being automatically responsive to the incident light as described for alternately inhibiting and permitting the laser action and thus provide the giant pulses.

If the concentration of the kryptocyanine in the cell 15 is decreased, less incident light is necessary to convert the condition of the cell from opaque to transparent and thus for a given light pump pulse width, more giant pulses for each light pump pulse may be produced. In fact, as the concentration is decreased even further, the number of gaint pulses increases in repetition frequency until a point is reached at which only ordinary laser action occurs.

In the particular system described in FIGURE 1 it was found that substantially no degradation of the bleachable dye existed, either visually or spectrophotometrically during approximately 100 giant pulse bursts. Further, measurement of the far field pattern of the beam B revealed no significant differences between the giant pulse and ordinary modes of operation, both having beam angles of $5 \times 10^{-3}$ radians. In addition, it is found that the spectral line width of the laser emission is actually narrower than is usually the case with ordinary laser action and in fact narrower than has ever heretofore been attained with giant pulse lasers.

In the particular setup as described, the system was not optimized to achieve the highest possible powers or most desirable pulse widths. Thus, the figures set forth are merely by way of one example.

The value of the dye concentration and the path length of the optical cavity may be chosen, depending upon the laser crystal gain and the cavity Q, to give cell length times absorption coefficient values between .01 and 100.

Differen members of the cyanine dye family may be chosen to absorb at specific wave length desired. In fact, it is believed that many other families of dyes should behave similarly to the cyanine dyes.

Further variations in the type of light control means operating in accordance with the principles described for the kryptocyanine organic dye are possible. For example, semiconductor material with a band gap somewhat less than the energy of the incident light might be used. In this event, the semi-conductor material is prepared in the shape of a thin wafer with typical thickness of approximately .001 inch. The principle of operation is based essentially on changing the absorptivity of the semi-conductor material by exciting the molecules between first and second energy levels. This operation is effected by pumping electrons from the valence band into the conduction band in a time short compared to the fallback or recombination time and thereby reduce the number of electrons available for the absorption process. Thus, when all of the electrons that could have been excited by the incident light of proper frequency have been transferred from the valence band to the conduction band, the material becomes transparent to light of that frequency.

The absorption coefficient for photon energies well above the band gap is approximately $10^4$ cm.$^{-1}$ which implies a large cross-section for absorption. Before the material can become transparent, enough electrons have to be pumped into the conduction band so that the energy measured from the highest energy occupied state in the conduction band to the lowest energy unoccupied state in the valence band is equal to the energy of the light photon. This could be a very large number if the energy of the incident photon is much greater than the band gap energy.

A more practical approach to use, is to have the energy of the incident light only slightly greater than the band gap so that only a relatively small number of electrons need be pumped to attain transparency. Therefore, a compromise must be made before selecting the band gap in terms of incident photon energy so that a minimum amount of energy is required to switch or convert the material. In this respect, one problem to be considered is the decreased value of absorption cross-section as the photon energy approaches the band gap energy.

A ternary semi-conductor compound such as $GaAs_xP_{1-x}$ which has a known property of permitting the selection of the band gap in a range of 2.24 e.v. to 1.38 e.v. by varying $x$ from zero to 1, could be used.

As other alternatives to organic dyes and semi-conductor materials, certain inorganic chemical substances may be feasible to use in certain laser systems for generating giant pulses.

The light control means actually described may be used in laser systems other than simple giant pulse lasers; for example, the bleachable type absorber could be used to isolate the various sections of a series arrangement of laser crystals in an oscillating configuration in order to prevent light from being amplified prior to oscillation. The same advantages would obtain for the case of an oscillator-amplifier configuration, as well as the case of a series arrangement of laser amplifiers.

Accordingly, the scope and spirit of this invention is not meant to be limited to the particular embodiment set forth.

In the present specification and appended claims, the word "molecules" is meant to include atoms or a given aggregation of atoms adapted to be collectively excited from a condition characterized by a high absorption cross-section to a non-absorption excited state.

What is claimed is:
1. A giant pulse laser device for producing a high peak power pulse of radiation comprising, in combination: a laser material; optical pumping means coupled to said material for effecting an inverted population state of laser ions in said material between given energy levels; regenerative means exhibiting high reflectance optically coupled to opposite end portions of said laser material to provide an optical cavity for stimulated emission; and a chemical substance positioned in said optical cavity and automatically responsive to an initial stimulated emission of radiation from said laser material to change from a substantially opaque condition to a substantially transparent condition to release said high peak power pulse of radiation, and then back to a substantially opaque condition upon cessation of said peak power pulse, said chemical substance constituting a reversibly bleachable solution of kryptocyanine having a high absorption cross section at the wave length of said stimulated emission.

2. A laser device according to claim 1, in which said kryptocyanine is dissolved in methyl alcohol.

References Cited

UNITED STATES PATENTS 3,270,291   8/1966   Kosonocky _____ 331—94.5

OTHER REFERENCES

Sorokin et al.: Ruby Laser Q-Switching Elements Using Phthalocyanine Molecules in Solution, IBM Journal of Research and Development, vol. 8, No. 2 (April 1964), pp. 182–184.

JEWELL H. PEDERSEN, *Primary Examiner.*

W. L. SIKES, *Assistant Examiner.*

U.S. Cl. X.R.

350—160